US012759179B2

(12) United States Patent
Querejeta

(10) Patent No.: US 12,759,179 B2
(45) Date of Patent: Oct. 13, 2026

(54) TOOL TO CUT OUT A PORTION OF THE CORE FOAM FROM A SIP PANEL

(71) Applicant: Mauro Nicolas Querejeta, San Martín de los Andes (AR)

(72) Inventor: Mauro Nicolas Querejeta, San Martín de los Andes (AR)

( * ) Notice: Subject to any disclaimer, the term of this patent is extended or adjusted under 35 U.S.C. 154(b) by 749 days.

(21) Appl. No.: 17/970,637

(22) Filed: Oct. 21, 2022

(65) Prior Publication Data

US 2024/0131741 A1 Apr. 25, 2024
US 2024/0227228 A9 Jul. 11, 2024

(51) Int. Cl.

*B26D 7/00* (2006.01)
*B26D 1/36* (2006.01)
*B26D 3/06* (2006.01)
*B26D 7/18* (2006.01)
*B26D 1/00* (2006.01)

(52) U.S. Cl.

CPC ............. *B26D 7/0006* (2013.01); *B26D 1/36* (2013.01); *B26D 3/06* (2013.01); *B26D 7/1863* (2013.01); *B26D 2001/006* (2013.01)

(58) Field of Classification Search

CPC .............. B23D 59/006; B23D 59/0064; B23D 59/007; B23D 47/02; B23D 45/003; B23D 45/006; B23D 45/02; B27B 5/06; B27B 5/04; B27B 27/10; B27D 5/006; B27D 7/0006; B26D 7/1863; B26D 1/36; B26D 51/026; B26D 5/006; B26D 7/0006; Y10T 83/7507; Y10T 83/667

USPC ........................................................... 83/821

See application file for complete search history.

(56) References Cited

U.S. PATENT DOCUMENTS

| | | | | |
|---|---|---|---|---|
| 10,625,437 | B2 * | 4/2020 | Harris | B23D 47/10 |
| 2005/0172769 | A1 * | 8/2005 | Maes | B23D 47/00 83/490 |
| 2022/0184843 | A1 * | 6/2022 | McCurry | B27B 9/02 |
| 2022/0314348 | A1 * | 10/2022 | Yu | B27B 5/207 |

FOREIGN PATENT DOCUMENTS

| | | | | |
|---|---|---|---|---|
| CN | 101767223 A * | 7/2010 | | B23D 45/042 |
| GB | 2598046 A * | 2/2022 | | B23D 59/006 |

OTHER PUBLICATIONS

English Translation of CN-101767223 (Year: 2010).*

* cited by examiner

*Primary Examiner* — Jennifer S Matthews

(57) ABSTRACT

Tool to scoop out the foam from a SIP panel that complies with the industry safety requirements, it is easy to use, and can be easily adjusted to different types and sizes of SIP panels. The tool to cut out a portion of the core foam from a sip panel, comprising: a power unit; a support frame attached to the power unit; an adjustable guiding unit attached to the support frame; and a scooping unit.

13 Claims, 12 Drawing Sheets

TOOL TO CUT OUT A PORTION OF THE CORE FOAM FROM A SIP PANEL

FIELD OF THE INVENTION

The field of application of the present invention is that of construction panels, specifically SIP (Structural Insulated Panels) construction panels or Structural Isothermal Panels.

BACKGROUND OF THE INVENTION

SIP construction panels are composite and high-performance panels used in floors, walls and ceilings for light residential and commercial buildings. These panels are manufactured in a factory and shipped to the construction site, where they can be quickly assembled to form an airtight and highly energy-efficient building envelope.

SIP panels are a simple composite sandwich panel. ASTM (American Society for Testing Materials) International defines these panels as "a three-layer construction formed by bonding a thin layer (face) on each side of a thick layer (core)." The term "composite" refers to any material in which two or more different materials are combined together, and yet remain uniquely identifiable in the mixture.

Generally, SIP panels are manufactured by sandwiching a core of rigid plastic insulating foam between two structural skins, although many different variations are included in the definition (based on the faces and the core materials). SIP panels are made with a variety of skin structural materials, including oriented strand board (OSB), treated plywood, metal and cement fiberboards (cement-based). However, any material which can be attached may be used as a coating. The basic materials of the core are typically expanded polystyrene (EPS), extruded polystyrene (XPS), or polyurethane, but other rigid insulators can also be used. The faces and the cores are bonded by structural adhesives. These variables allow the panels can be optimized to the specific needs of a project. SIP panels are usually available in thicknesses ranging from 11.43 cm to 31.11 cm (4½" to 12¼").

SIP panels can be as large as 9 feet by 28 feet. OSB coatings also have custom sizes and many manufacturers offer curved SIP panels for curved ceiling applications. This design flexibility, as well as different core combinations and coating materials, allow unique performance properties for each project. The flexibility of SIP panels, their resistance and energy efficiency make them an important construction material for high performance buildings.

Structural insulated panels (SIPS) have been around for a number of years. In the 1950's until about 1980, panels were made 4 feet wide and up to 12 feet long with commodity plywood and other materials. Some of these panels have finishes that were acceptable as exterior wall surfaces. The most common was a plywood pattern called reverse board and batten or sometimes T 1-11 ply. The inside of that was a material such as drywall or plywood. The center of these panels was plastic foam to complete a SIP panel.

The SIP panels discussed above were largely superseded when oriented strand board (OSB) became available in 8 foot by 24 foot sheets. The 4 foot wide panels were too costly and inefficient to install when one big panel could replace six small 4-foot-wide panels. However, a problem with this big 8 foot by 24 foot panel was that it did not have a finished surface on the inside nor outside, since OSB does not provide it. Thus, the big panels were usually covered with drywall on the inside and covered with exterior siding on the outside. Unfortunately, this process of covering inside and outside surfaces after building/wall construction is very expensive and made construction with SIPs more expensive than conventional "stick" construction. Even though SIP construction could save 30% to 50% of the heat loss, there has been continued resistance to use the SIP systems because of costs of material versus "stick" construction.

A wall is constructed with Structural Insulated Panels by joining them with splines (smaller SIP pieces that lock between the panels) or other joining systems. This is a full-length spline that joins both panels together. The spline like the panels are also insulated with EPS (expanded polystyrene) and has an outer OSB (oriented strand board) skin to strengthen the joint. Window and door openings are cut out with a saw. The finished product is a strong, secure wall that will withstand the roofs weight, snow, and the pushing force of the wind.

The SIP panels are joined together with an insulated spline fitted inside. Screws are then screwed through the OSB of the panel and into the spline OSB to make the joint very strong and secure, glue may be used at this point as well to seal the joint and give it extra strength.

Onsite modification can easily be done using a few additional SIP specific tools. Oversized panels can be cut using a beam saw or a beam cutting attachment to a circular saw. When the SIP panel is cut the original space to fit the spline is gone and it is necessary to scoop some foam out to create a space to fit the spline inside. The foam core can then be recessed for splines or dimensional lumber using a hot wire foam scoop or specialized angle grinder attachment.

The hot wire foam scoop comprises heating a U-shape wire and pass it over the foam. This is a slow and dangerous process during which the operator applies a hot wire to the foam directly, burning the foam out and creating a longitudinal hollow section to insert the spline during the construction process.

There are some grinder attachments used to mechanically scoop the foam out the panel that basically comprise some adaptations to a circular saw to cut out the foam from the panel. None of these solutions offer a safe and adjustable solution to scoop the foam out when the SIP panel needs to be cut or adjust.

One of the most common ways to solve this problem is by using a regular jigsaw of circular saw to cut out a piece of foam. Since this is a dangerous procedure, it is also possible to use a multi tool introducing the cutting blade into the foam a depth equal to the space needed to fit the spline, making regularly spaced cuts along the foam edge and using the same tool make a horizontal cut scraping out the pieces of foam one by one until the whole length of the SIP panel is completed. Even though this procedure achieves the goal of scooping out a piece of foam from the panel to create the space needed to fit the spline, it is a slow and cumbersome process.

It is the main purpose of the present invention to provide a specific tool to scoop out the foam from a SIP panel that complies with the industry safety requirements, it is easy to use, and can be easily adjusted to different types and sizes of SIP panels.

SUMMARY OF THE INVENTION

It is a purpose of the present invention a tool to cut out a portion of the core foam from a sip panel, comprising:

a power unit;

a support frame attached to the power unit;

an adjustable guiding unit attached to the support frame;

a scooping unit;

the power unit including an electric motor with a power shaft, a power cord, and a handle;

the adjustable guiding unit attached to the support frame includes a frame to which an adjustable upper flat guide and an adjustable lower flat guide are slidably mounted;

the scooping unit including a scooping head coupled to the electric motor's shaft.

It is also a purpose of the present invention a tool wherein the power unit is an electric motor electrically fed by plugging in the power cord to a power source.

It is also a purpose of the present invention a tool wherein the support frame includes a rectangular rigid metal frame with a circular hole through which the power shaft projects, and a set of ventilation grooves.

It is also a purpose of the present invention a tool wherein the scooping head is a solid metal piece with at least two scooping elongated edges to which respective blades are attached.

It is also a purpose of the present invention a tool wherein the adjustable guiding unit comprises a flat base with a frontal flat wall and two lateral walls, the frontal flat wall includes an elongated horizontally-arranged opening.

It is also a purpose of the present invention a tool wherein the frontal flat wall includes two vertically-arranged upper slots and two vertically-arranged lower slots; and the lateral walls include respective horizontally-arranged slots.

It is also a purpose of the present invention a tool wherein to said vertically-arranged upper slots the upper flat guide is slidably mounted and to said vertically-arranged lower slots the adjustable lower flat guide is slidable mounted.

It is also a purpose of the present invention a tool wherein a foam debris suction channel is attached to the support frame; said channel includes an elongated hollow tube-like body with a debris inlet located next to the scooping head and a debris exit on the opposite side; the debris exit includes a cylindrical spout to which an outside suction means may be connected, capable of creating a suction force inside the suction channel to suck the foam debris away from the tool when the tool is scooping the foam out from a SIP panel.

It is also a purpose of the present invention a tool wherein the handle is defined by a protruding arm attached to the power unit that ends in a rounded head and is located above the level of the upper flat guide.

It is also a purpose of the present invention a tool wherein the adjustable upper flat guide and the adjustable lower flat guide are facing each other and include an inner flat horizontally-arranged face capable of being in contact with the outer surface of the inner and outer skin of the SIP panel to be treated respectively when the tool is scooping out foam from said panel.

It is also a purpose of the present invention a tool wherein the adjustable upper and lower flat guides are mounted to the guiding unit through respective threaded bolts.

BRIEF DESCRIPTION OF THE DRAWINGS

These and other features of the subject invention will be better understood in connection with the detailed description in conjunction with the drawings, of which.

DETAILED DESCRIPTION

Figure 1:
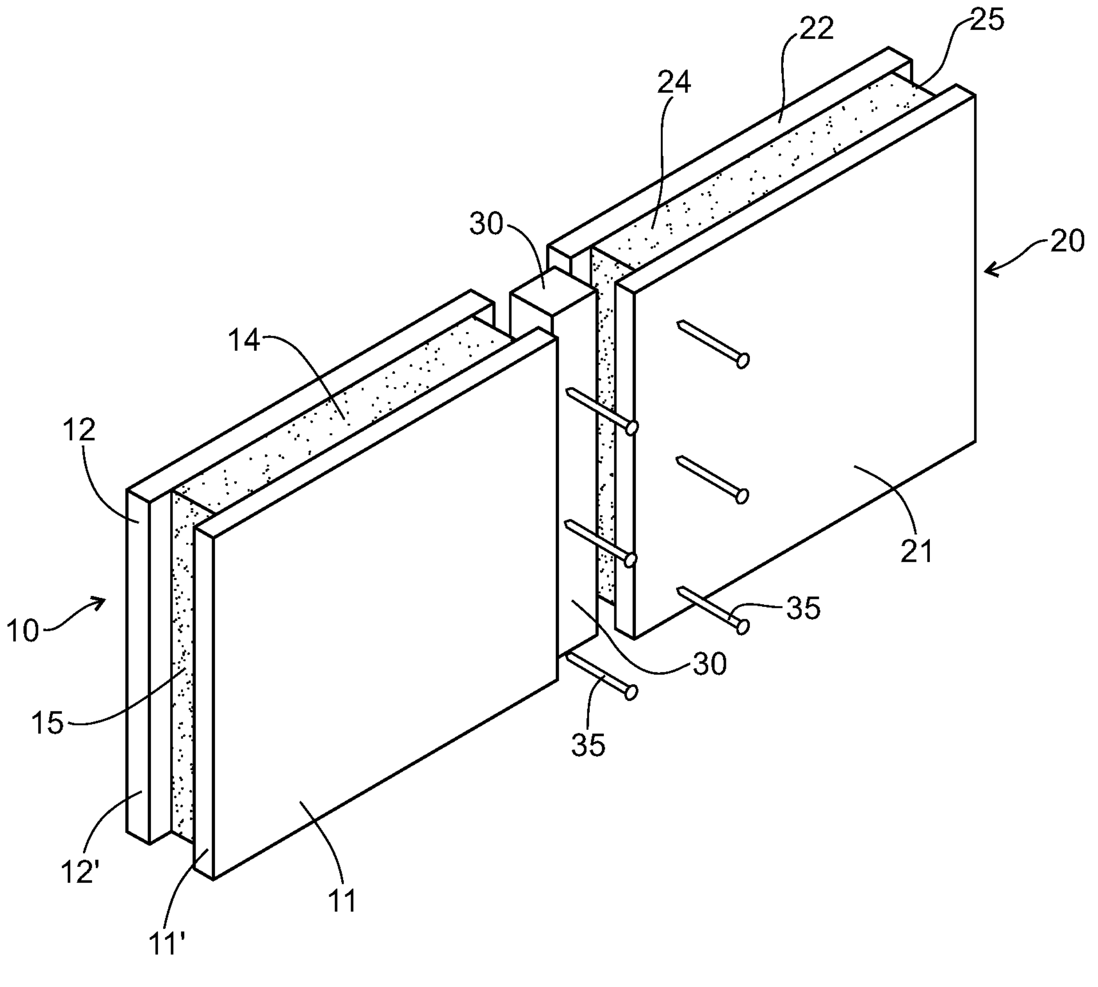
FIG. 1 is a general perspective view of a SIP panels assembly showing two SIP panels to be assembled, a block-spline joint between them and fasteners used to hold the parts together.
Figure 2A:
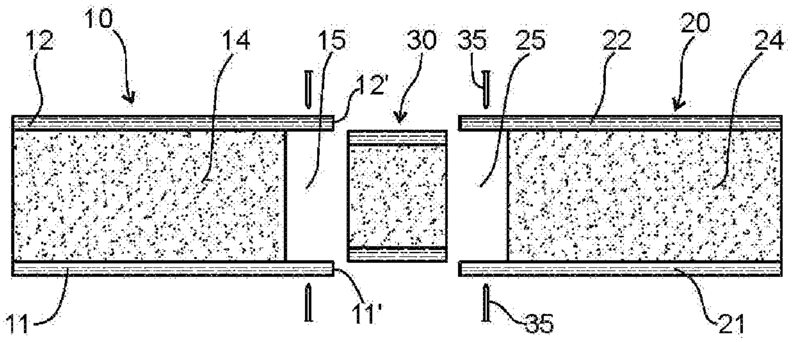
FIGS. 2A-2B is a cross sectional view showing how two SIP panels of FIG. 1 are assembled using a joining spline.
Figure 2B:
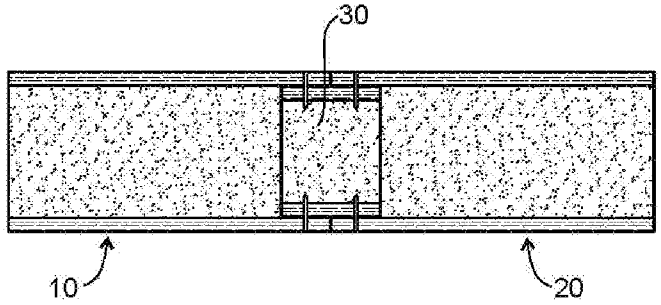

FIG. 1 shows how two ordinary SIP panels 10-20 are assembled. Each panel 10-20 includes an outer skin 11-21 and an inner skin 12-22. Between both skins 11-12 and 21-22 there is a thick layer of foam core 14-24 forming a solid piece. The foam core is generally one of the following: expanded polystyrene (EPS), extruded polystyrene (XPS), and polyurethane foam (PUR). In order to create a space to fit a block-spline joint 30 when two panels are assembled, each panel includes a lateral space 15-25 between the inner face of the foam 14-24 and the outer side 11'-12' of the inner and outer skins 11-12. As it is clearly shown in FIGS. 2A and 2B, the block-spline joint is located in the space created by the respective spaces 15-25 of each panel and then the assembly is secured through adhesives and nails 35.

Figure 3:
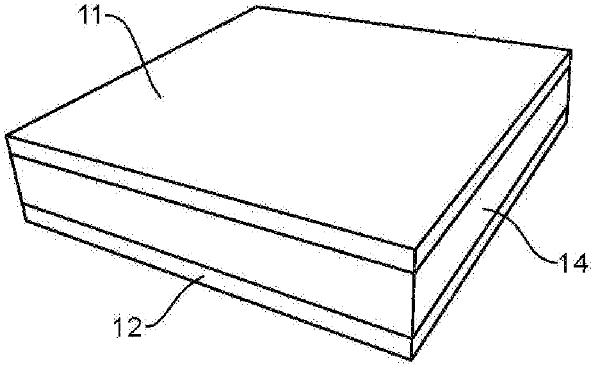
FIG. 3 is a general perspective view of a SIP panel cut out showing how the foam core flushes with the inner and outer skin of the SIP panel.
Figure 4:
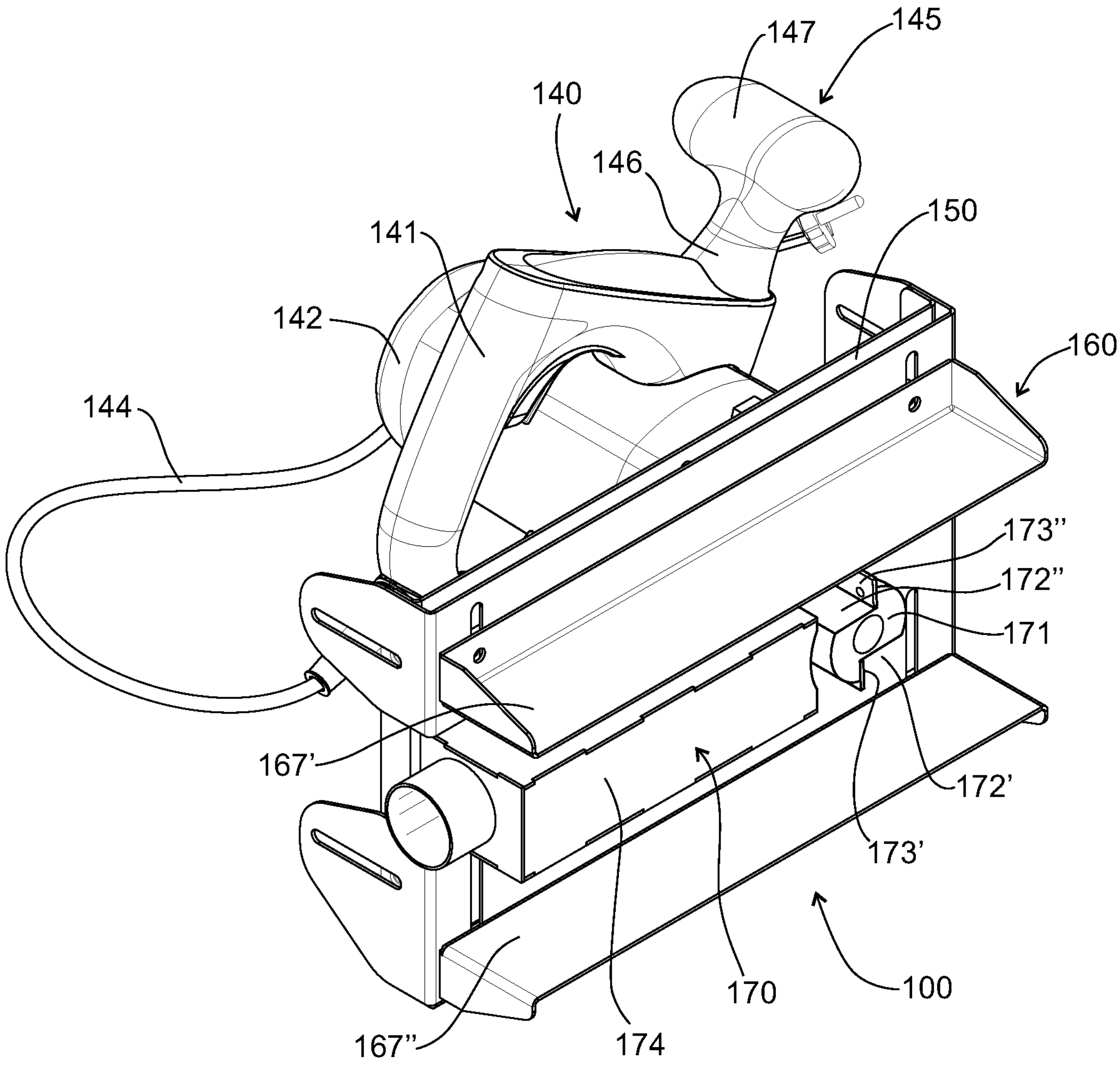
FIG. 4 is a general perspective view of the tool in accordance with the present invention

Each SIP panel has a predetermined size. In order to adjust the panel to the size of the construction to be built it must be cut out to fit the necessary measures. FIG. 3 shown an example of a piece of SIP panel cut out from a full SIP panel. Every time a piece is cut out, the foam core 14-24 flushes to the edge of the inner and outer skins and there is no space 15-25 to fit the above mentioned joining spline 30. This is the reason why it is necessary to create that space by cutting out a portion of the foam 14.

The tool 100 in accordance with the present invention is illustrated in FIGS. 4-16. It comprises a power unit 140, a support frame 150 attached to the power unit 140, an adjustable guiding unit 160 attached to the support frame 150, and a scooping unit 170.

The power unit 140 comprises an external case 141 to which an electric motor 142 is attached, with a power shaft 143, a power cord 144 (with which the power unit 140 may be plugged into a power source) and a handle 145 defined by a protruding arm 146 that ends in a rounded head 147.

Figure 16:
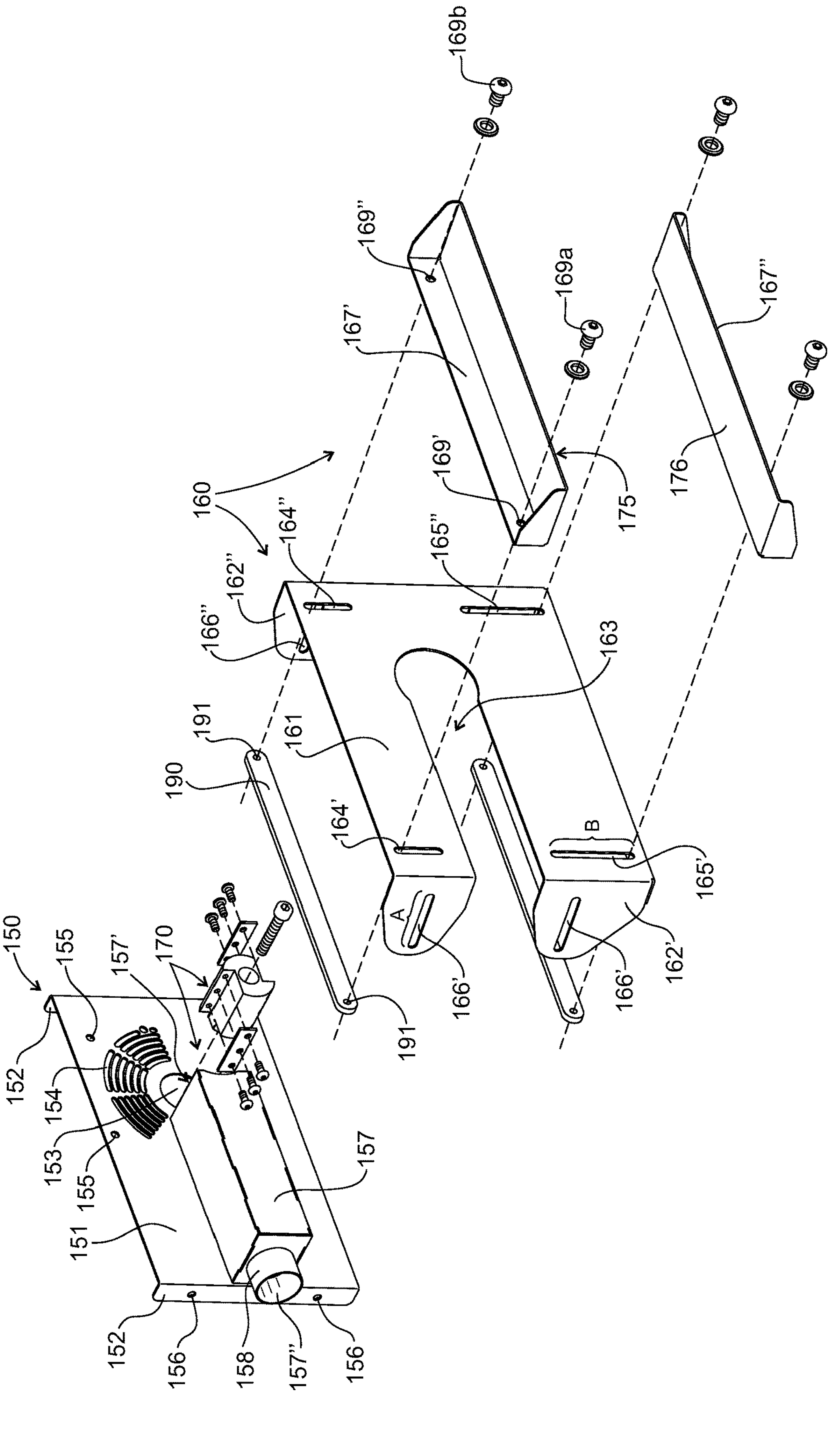
FIG. 16 is an exploded perspective view showing how the parts of the guiding unit are attached to the scooping unit

A supporting frame 150 is attached to the power unit 140 (FIG. 16). This frame comprises a rectangular metal piece including a front flat face 151 with two short perpendicular side portions 152. The front face 151 includes a circular hole 153, three sets of curved ventilation grooves 154, a couple of small holes 155 and a suction channel that is part of the scooping unit explained below. Each side portion 152 includes respective spaced apart holes 156.

The adjustable guiding unit 160 comprises a flat base with a frontal flat wall 161 and two lateral walls 162'-162". The frontal flat wall 161 includes a cut-out portion that defines an elongated horizontally-arranged opening 163. The frontal flat wall 161 also includes two vertically-arranged upper slots 164'-164" and two vertically-arranged lower slots 165'-165", The lateral walls 162'-162" include respective horizontally-arranged slots 166'-166". Said slots 164'-164" and 165'-165" may be between 50-200 mm long (1.96-7.87 inches), and said slots 166'-166" may be between 0-150 mm long (0-5.9 inches).

The adjustable guiding unit 160 also includes an adjustable upper flat guide 167' and an adjustable lower flat guide 167". Each guide includes a rectangular flat portion 168'-168" and a couple of holes 169'-169" The upper flat guide 167' is slidably attached to the frontal flat wall 161 by screwed bolts **169*a*-169*b* that pass through the slots 164'164" and are threaded to threaded holes 191 of an adjusting bar 190. By using this adjusting bar 190** it is not necessary to use nuts to adjust the flat guide, as it will be explained in detail below.

The scooping unit 170 includes a scooping head 171 coupled to the electric motor's shaft 143. Said scooping head 171 comprises a solid metal piece defined by a cylindrical shape with two diametrically opposed L-shape cut-out portions 172'-172" on one face of which respective blades 173'-173" are attached. The scooping unit also includes a suction channel 174 defined by a rectangular hollow tube 157 with a debris inlet 157' and a debris exit 157". As shown in FIG. 16 the debris exit includes a cylindrical spout 158 to be connected to an outside suction means (not illustrated) capable of creating a suction force inside the suction channel 157 to suck the foam debris 211 away from the tool 100 when the tool is scooping the foam out from a SIP panel, as it will be explained in detailed below.

Figure 5A:
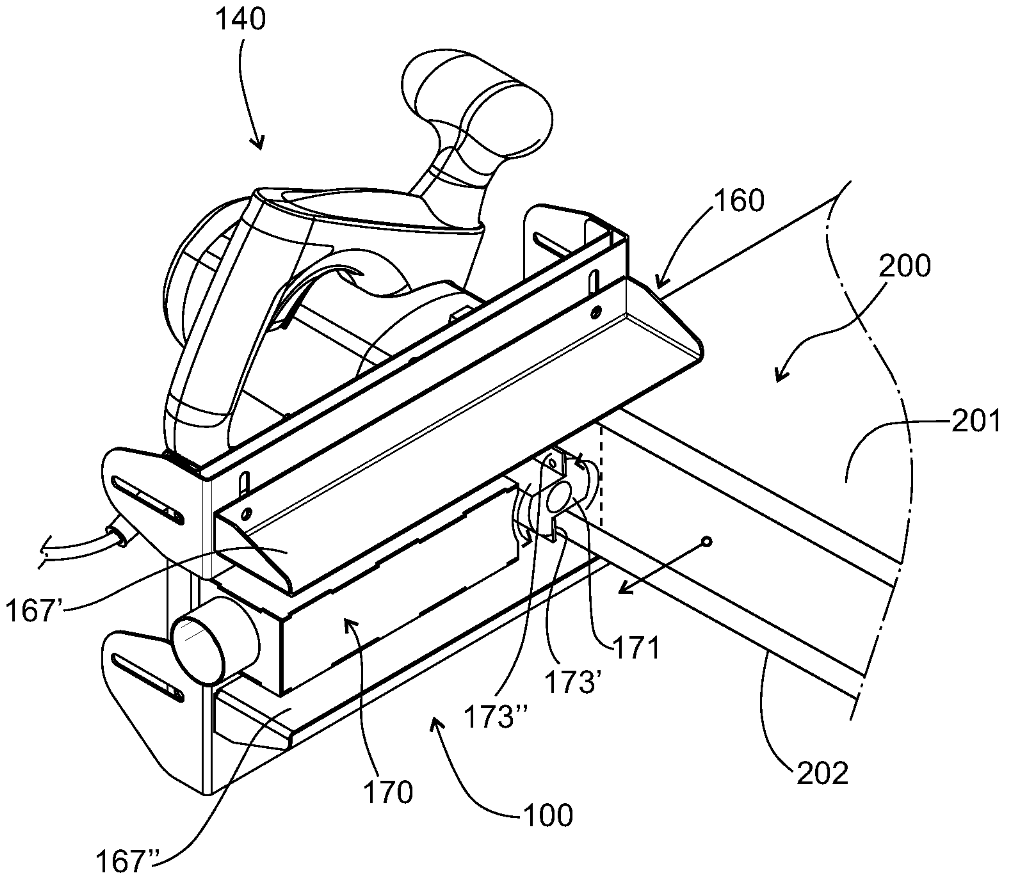
FIG. 5A is a general perspective view showing the tool in accordance with the present invention scooping the foam out from a cut out piece of a SIP panel.
Figure 5B:
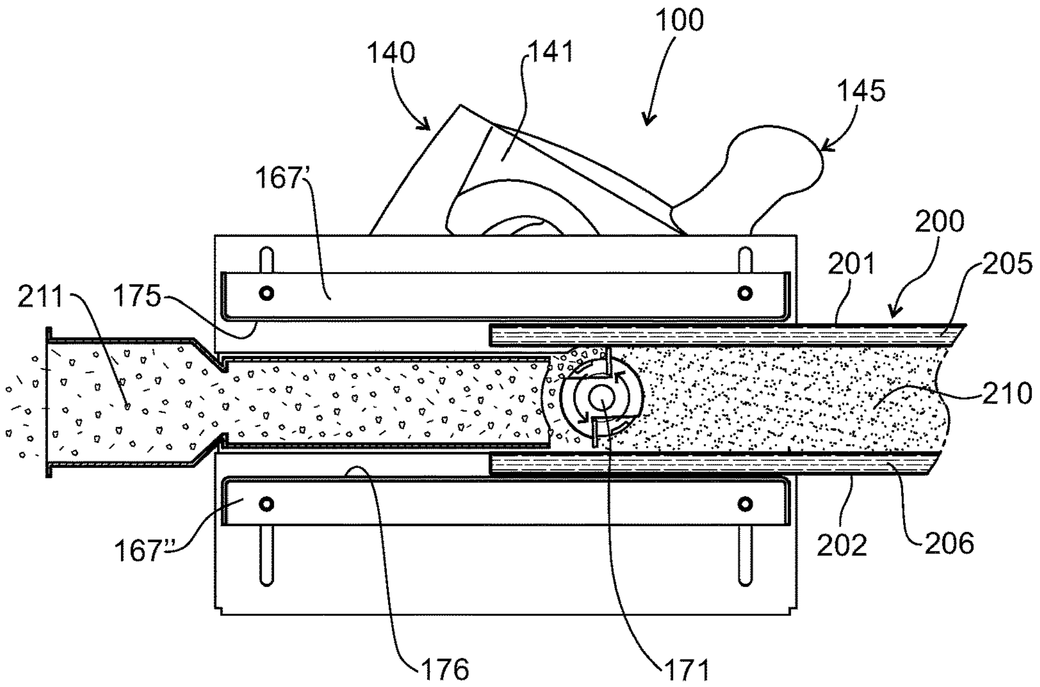
FIG. 5B is a cross sectional view of the tool of FIG. 5A while the scooping head is working on the foam, and the debris are sucked into the suction passage by a suction device (not illustrated).
Figure 6:
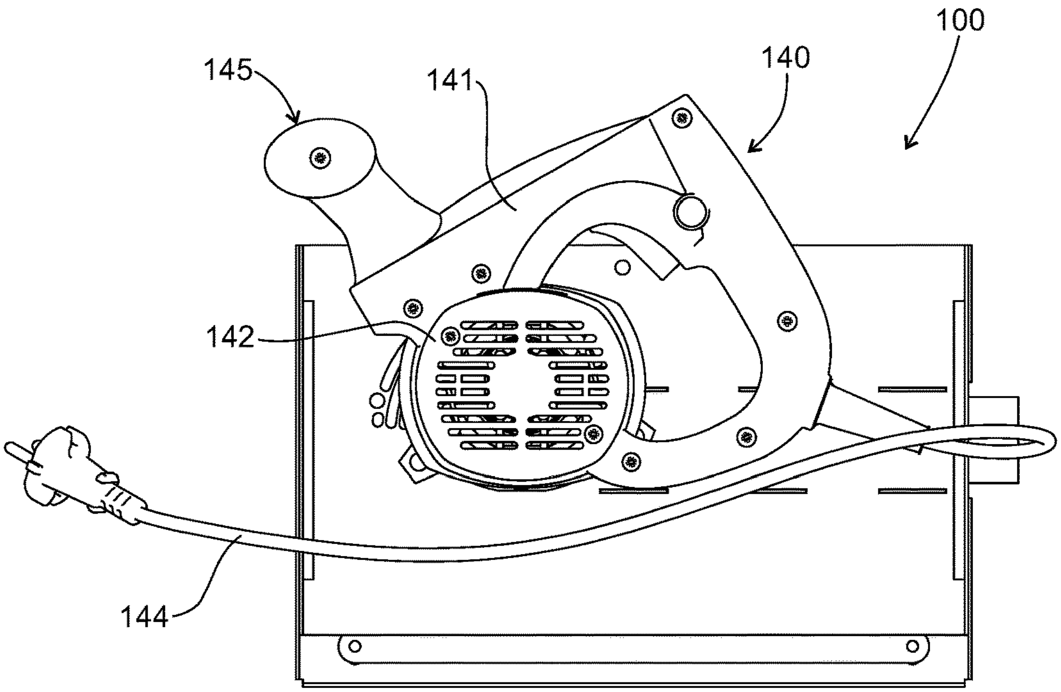
FIG. 6 is a left side elevational view of the tool of FIG. 4.
Figure 7:
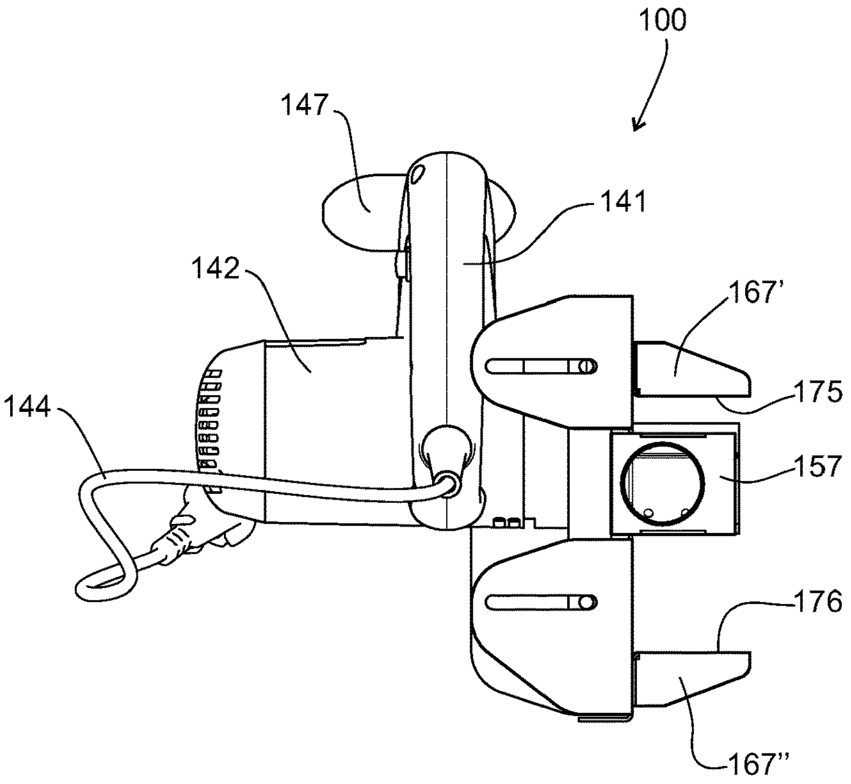
FIG. 7 is a front elevational view of the tool of FIG. 4.
Figure 8:
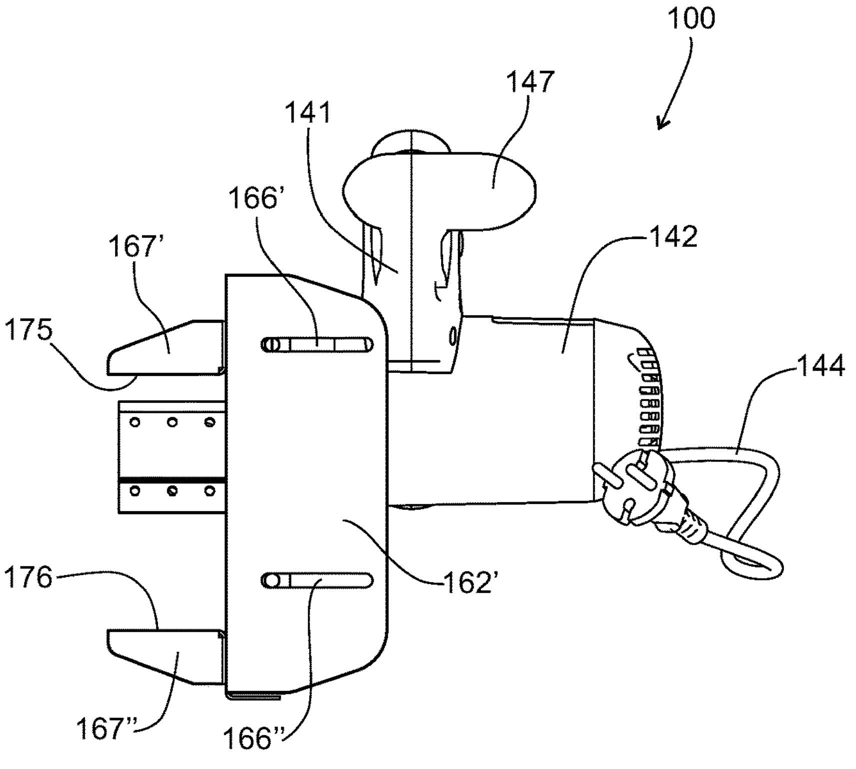
FIG. 8 is a rear elevational view of the tool of FIG. 4.
Figure 9:
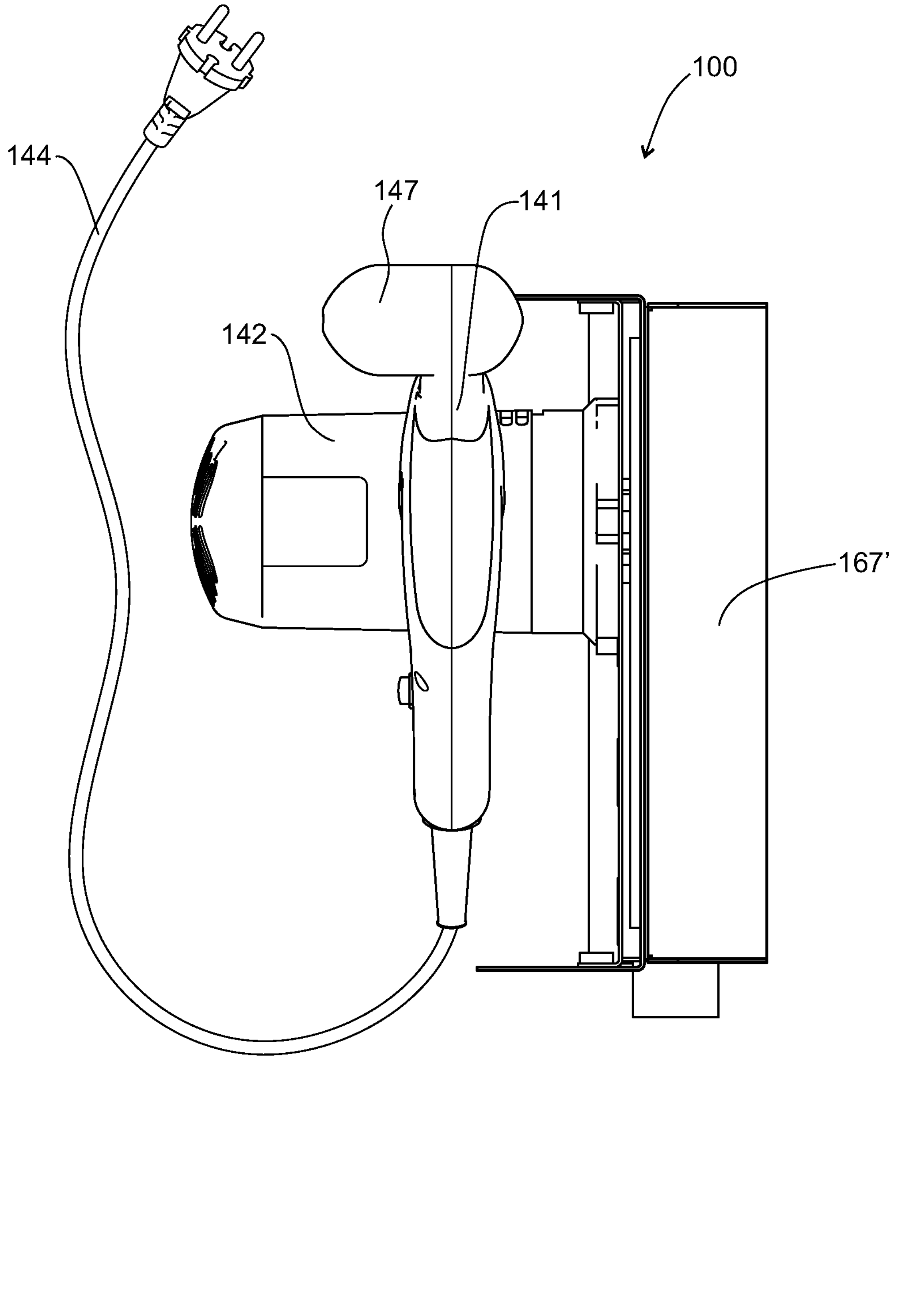
FIG. 9 is a top plan view of the tool of FIG. 4.
Figure 10:
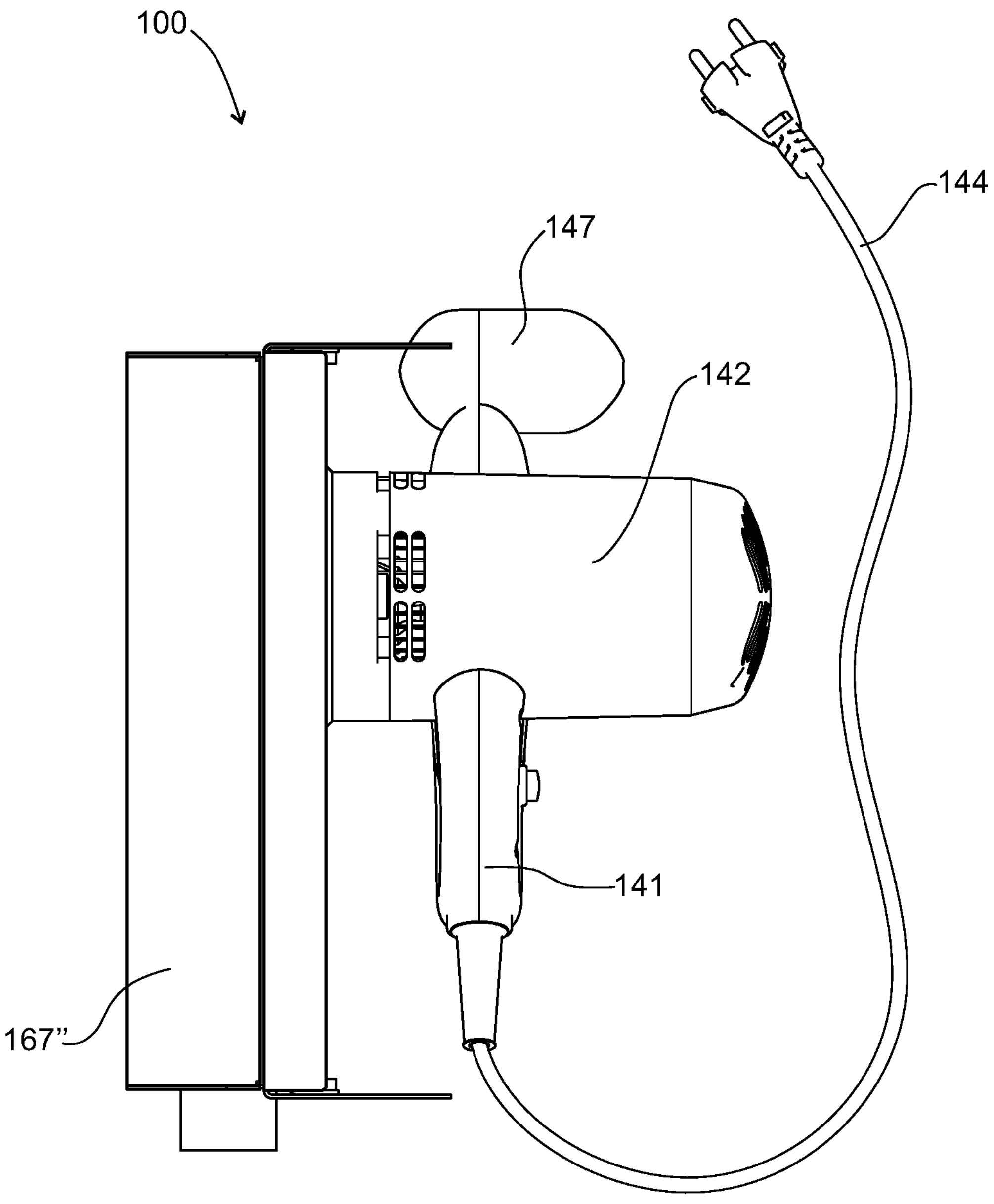
FIG. 10 is a bottom plan view of the tool of FIG. 4.
Figure 11:
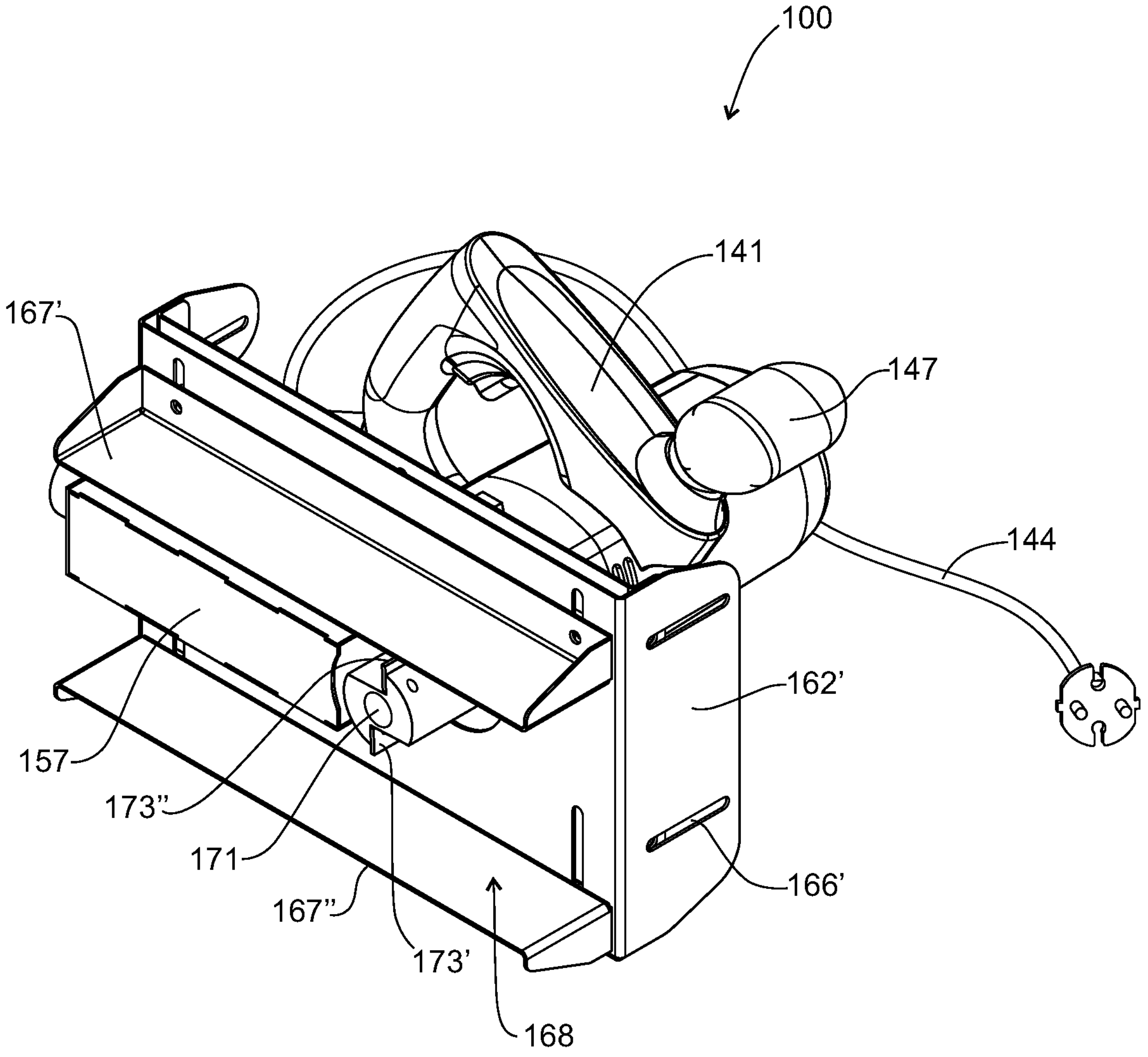
FIG. 11 is another perspective view this time illustrating the tool of the present invention from a frontal angle.
Figure 12:
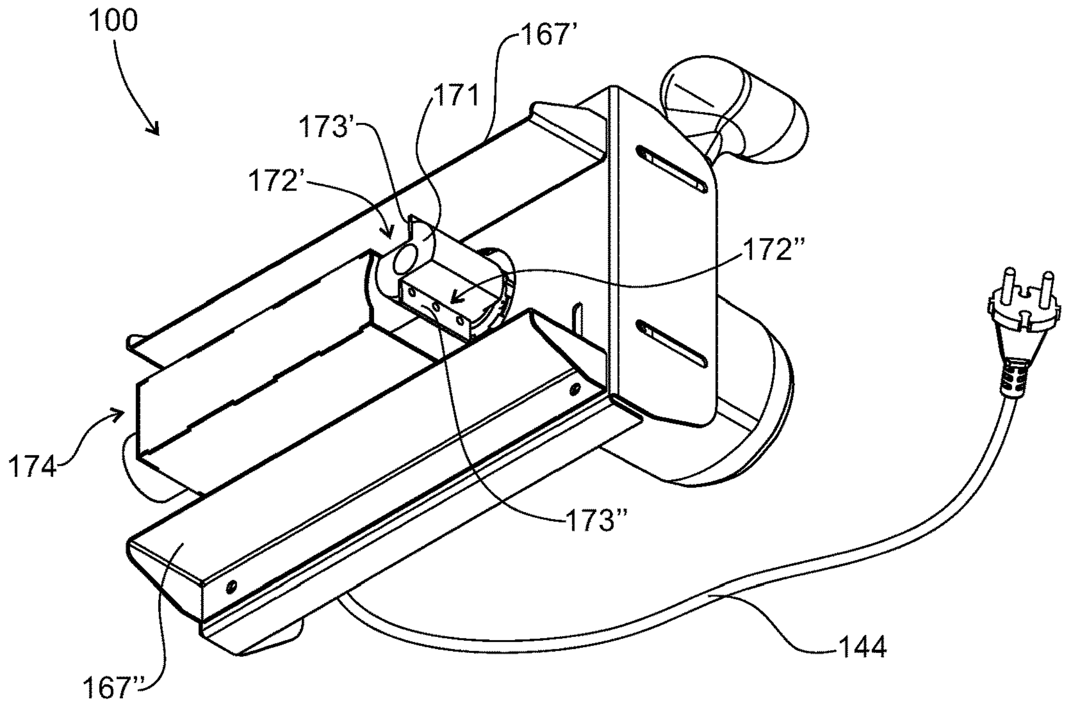
FIG. 12 is another perspective view showing in detail the scooping device.
Figure 13:
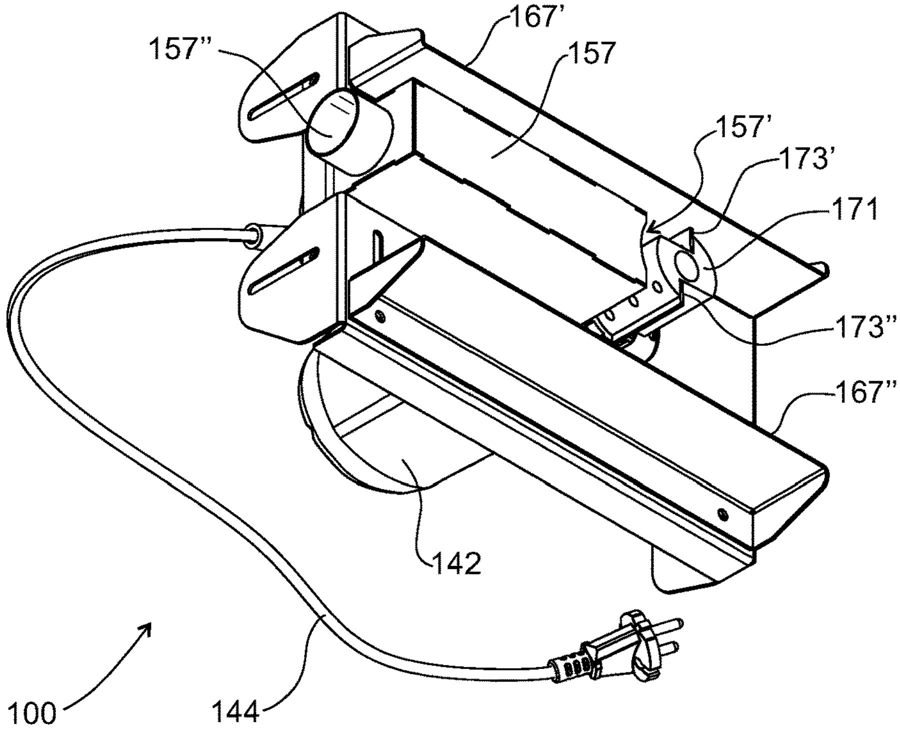
FIG. 13 is a perspective view similar to FIG. 9 showing in detail the scooping device from a different angle.
Figure 14:
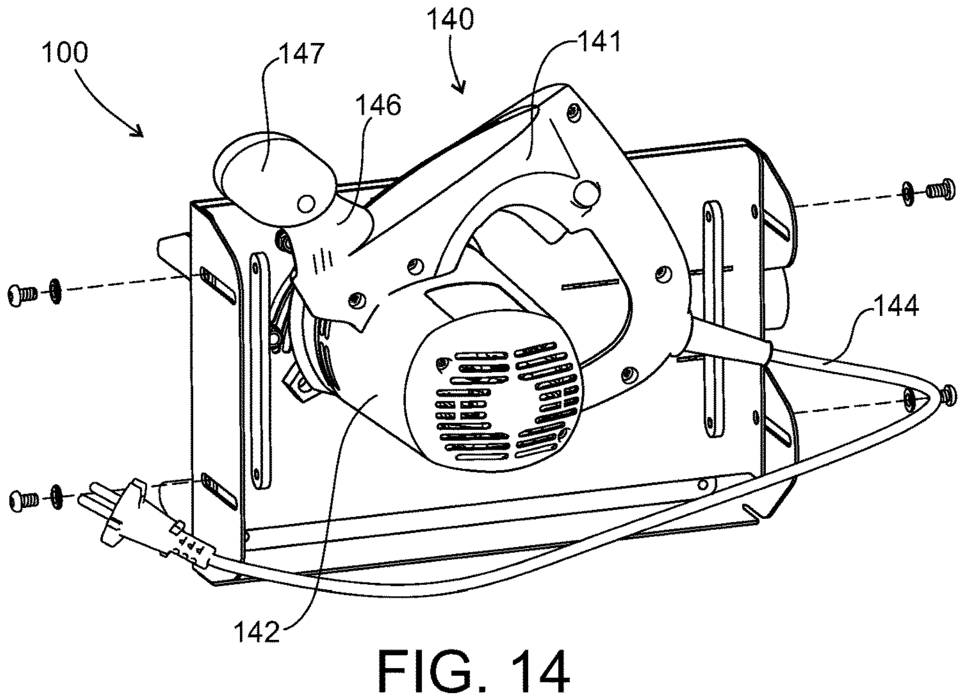
FIG. 14 is a perspective view showing the power unit attached to the guiding unit.
Figure 15:
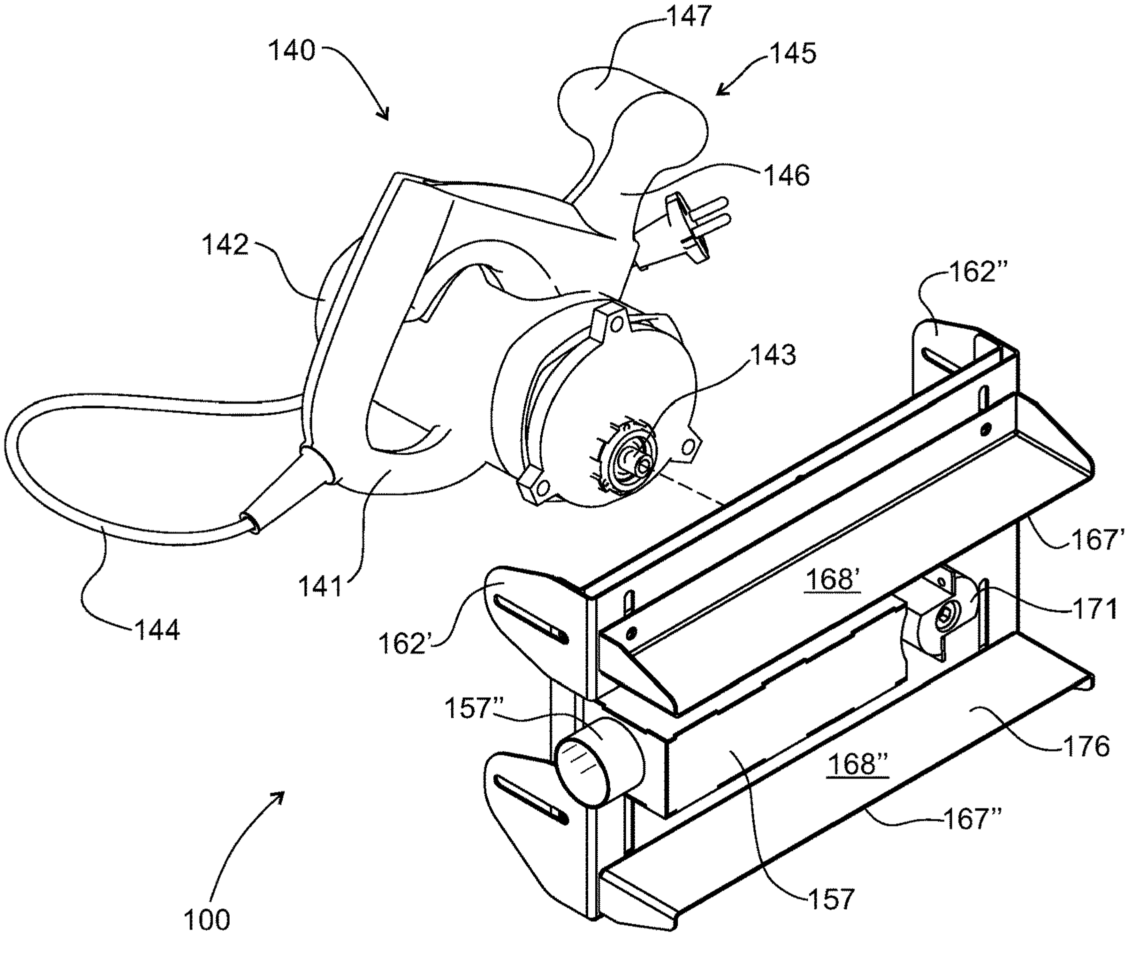
FIG. 15 is a partially exploded perspective view showing the power unit detached from the guiding/scooping unit; finally

As shown in FIGS. 5A-B the adjustable upper flat guide 167' and the adjustable lower flat guide 167" are facing each other and include respective inner flat horizontally-arranged faces 175-176 capable of being in contact with the outer surface 201 of the inner skin 205 of the SIP panel 200 and the outer surface 202 of the inner skin 206 of the SIP panel 200 respectively when the tool is scooping out foam 210 from said panel.

When the operator needs to scoop out a portion of the foam 210 of a cut out SIP panel 200, the tool 100 needs to be connected to a power source with the power cord 144. Then the tool is placed in the scooping position by inserting one end of panel 200 to be scooped (FIGS. 5A and B) between the upper surface 175 of the upper guide 167' and the lower surface 176 of the lower guide 167". To adjust the thickness of the panel to be scooped, the operator needs to adjust the distance between guides 167'-167" by unscrewing and screwing back bolts **169*a*-169*b* to the adjusting bar 190. The length of slots 164'-164"** allows the tool to process SIP panels with a 50-200 mm (1.96-7.87 inches) thickness range.

Then the operator needs to determine how deep the scooping head 171 needs to go into the core foam 210. In order to adjust how deep the scooping head 171 will enter in the foam 200 the operator may move the whole scooping unit 160 away or closer to the power unit 140 using the sliding mounting of the adjustable guiding unit 160 to the support frame 150 through threaded bolts 180 which pass through slots 166'-166" and orifices 156 and are threaded to respective nuts (not illustrated)

Therefore, the tool may adjust to different panel thicknesses in a range of 50-200 mm (1.96-7.87 inches), and to different scooping depths in the range of 0-150 mm (0-5.9 inches). Once the tool 100 is in operating position (FIGS. 5A-B) with all the parameters already set, the engine 142 is turned on and the tool is pushed forward with the handle 147. The scooping head 171 spins at high speed and the blades 173'-173" facing the foam 210 scoop said foam out and the suction created inside the suction channel 174 by the suction means (not illustrated) takes the foam debris 211 out of the panel 20 to an appropriate disposal place (a trash bag or the like).

Even when it has been described and illustrated the present tool fed by an external power source through the power cord 144 it is obvious for those skilled in the art that the electric motor 142 can be electrically fed by a rechargeable battery. Also, the material mentioned in this description used to make the pieces of this tool is metal, but any other appropriate materials may be used, including composite materials involving plastic, fibers, etc.

REFERENCE NUMBERS USED

10: SIP Panel
11: outer skin
11': outer side
12: inner skin
12': outer side
14: foam core
15: space
20: SIP Panel
21: outer skin
22: inner skin
24: foam core
25: space
30: spline
35: nails
100: tool
140: power unit
141: external case
142: electric motor
143: power shaft
144: power cord
145: handle
146: arm
147: head
150: supporting frame
151: front flat face
152: side portions
153: circular hole
154: ventilation grooves
155: small holes
156: holes
157: hollow tube
157': debris inlet
157": debris exit
158: cylindrical spout
160: guiding unit
161: flat wall
162'-162": lateral walls
163: opening

164'-164'':upper slots
165'-165'': lower slots
166'-166'': slots
167': upper flat guide
167'': lower flat guide
168'-168'': rectangular flat portion
169'-169'': holes
**169*a*-169*b*''** bolts
170: scooping unit
171: scooping head
172'-172'': cut-out portion
173'-173'': blades
174: suction channel
175: face
176: face
190: adjusting bar
191: threaded hole
200: SIP panel
201: outer surface
202: outer surface
205: inner skin
206: inner skin
210: foam
211: foam debris

What is claimed is:

1. A tool for cutting out at least a portion of a core foam from a SIP panel, the tool comprising:
- a power unit;
- a support frame having a front flat face attached to the power unit;
- an adjustable guiding unit having an upper flat guide and a lower flat guide attached to a frontal flat wall, the front wall being attached to and flush against the front flat face of the support frame; and,
- a scooping unit including a rectangular suction channel attached to the support frame and extending through a cut-out portion of the frontal flat wall and between the upper and lower flat guides of the guiding unit, a spinning scooping head coupled to the power unit having two diametrically opposed blades, and
- the suction channel having a debris inlet proximal to the spinning scooping head.

2. The tool in accordance with claim 1, wherein the power unit includes an electric motor with a power shaft, a power cord, and a handle.

3. The tool in accordance with claim 2, wherein the scooping head is coupled to the power shaft to power the spinning of the scooping head.

4. The tool in accordance with claim 2, wherein the electric motor is electrically fed by the power cord plugged into an external power source.

5. The tool in accordance with claim 2, wherein the electric motor is electrically fed by a rechargeable battery.

6. The tool in accordance with claim 2, wherein the support frame includes a rectangular rigid metal frame with a circular hole through which the power shaft projects and connects to the scooping head, and a set of ventilation grooves.

7. The tool in accordance with claim 1, wherein the upper flat guide and the lower flat guide are each slidably attached to the frontal flat wall.

8. The tool in accordance with claim 7, wherein the upper flat guide and the lower flat guide are facing each other and include an inner flat horizontally-arranged face capable of being in contact with an outer surface of an inner and outer skin of the SIP panel respectively when the tool is scooping out foam from said panel.

9. The tool in accordance with claim 1, wherein the scooping head is a solid metal piece.

10. The tool in accordance with claim 1, wherein the frontal flat wall includes two vertically-arranged upper slots and two vertically-arranged lower slots; and the lateral walls include respective horizontally-arranged slots.

11. The tool in accordance with claim 10, wherein an upper flat guide is slidably attached to the vertically arranged upper slots and an adjustable lower flat guide is slidably attached to said vertically-arranged lower slots.

12. The tool in accordance with claim 1, wherein the suction channel includes a debris exit on a second end opposite to the debris inlet.

13. The tool in accordance with claim 12, wherein the debris exit includes a cylindrical spout connectable to an outside suction means capable of creating a suction force inside the suction channel to suck foam debris away from the scooping head when the tool is scooping the foam out from a SIP panel.

* * * * *